United States Patent
Spottiswoode et al.

(10) Patent No.: US 12,545,122 B2
(45) Date of Patent: Feb. 10, 2026

(54) PRE-EMPTIVE WHEEL SLIP CONTROL BY WHEEL DISPLACEMENT

(71) Applicant: Rivian IP Holdings, LLC, Plymouth, MI (US)

(72) Inventors: Quentin Arthur Cradock Watson Spottiswoode, Horsham (GB); David Martin Armstrong, Birmingham (GB); Michael Fei-Kit Tung, Irvine, CA (US); Thomas James Emery, Morgan Hill, CA (US)

(73) Assignee: Rivian IP Holdings, LLC, Plymouth, MI (US)

(*) Notice: Subject to any disclaimer, the term of this patent is extended or adjusted under 35 U.S.C. 154(b) by 212 days.

(21) Appl. No.: 18/129,415

(22) Filed: Mar. 31, 2023

(65) Prior Publication Data
US 2024/0326607 A1 Oct. 3, 2024

(51) Int. Cl.
*B60L 15/20* (2006.01)

(52) U.S. Cl.
CPC ....... *B60L 15/2036* (2013.01); *B60L 2240/24* (2013.01); *B60L 2240/423* (2013.01); *B60L 2240/465* (2013.01); *B60L 2250/26* (2013.01); *B60L 2260/28* (2013.01)

(58) Field of Classification Search
CPC ............. B60L 15/2036; B60L 2240/24; B60L 2240/423; B60L 2240/465; B60L 2250/26; B60L 2260/28; B60L 2220/42; B60L 15/20; B60L 15/32; B60W 30/18172; B60W 10/08; B60W 2710/083
See application file for complete search history.

(56) References Cited

U.S. PATENT DOCUMENTS

| | | | |
|---|---|---|---|
| 2014/0025241 A1* | 1/2014 | Andou | B60K 28/16 701/22 |
| 2019/0275994 A1* | 9/2019 | Zhao | B60T 1/10 |
| 2020/0001716 A1* | 1/2020 | Takano | B62D 5/0463 |
| 2021/0146776 A1* | 5/2021 | Bollinger | H01M 10/44 |
| 2024/0116367 A1* | 4/2024 | Nguyen | B60W 30/02 |
| 2024/0198795 A1* | 6/2024 | Subramanian | B60K 28/16 |

* cited by examiner

*Primary Examiner* — Kyle J Kingsland
(74) *Attorney, Agent, or Firm* — HG LAW LLP (57) ABSTRACT

Methods and systems are provided for determining a plurality of traction limits corresponding to each of a plurality of wheels of a vehicle and determining a grounded torque request. Based on the plurality of traction limits, the grounded torque request is distributed to each of the plurality of wheels. If a grounded torque request to a first wheel of the plurality of wheels exceeds a traction limit for the first wheel, the torque to the first wheel may be reduced, and an increased torque is applied to a second wheel of the plurality of wheels.

14 Claims, 9 Drawing Sheets

PRE-EMPTIVE WHEEL SLIP CONTROL BY WHEEL DISPLACEMENT

INTRODUCTION

The present disclosure is directed to preventing vehicle wheel slip, and more particularly to preventing vehicle wheel slip on uneven ground surfaces.

SUMMARY

Vehicles may include a plurality of wheels, where one or more of the wheels may be provided with torque to accelerate the vehicle. However, if the torque provided to one of the wheels is too high with respect to the friction of the ground surface that the vehicle is on, the wheel may slip. In accordance with the present disclosure, system and methods are provided for determining traction limits for each respective wheel, and distributing a grounded torque request to the wheels based on the traction limits to limit or prevent wheel slip.

In some embodiments, a method is provided that comprises determining a plurality of traction limits corresponding to each of a plurality of wheels of a vehicle. The method further comprises determining a grounded torque request (e.g., for accelerating the vehicle), and distributing the grounded torque request to each of the plurality of wheels based on the plurality of traction limits.

In some embodiments, determining the grounded torque request comprises determining a position of an accelerator pedal of the vehicle. In some embodiments, distributing the grounded torque request to each of the plurality of wheels comprises determining whether a grounded torque request for a first wheel of the plurality of wheels exceeds a respective traction limit. If the traction limit is exceeded for the first wheel, then a reduced torque is applied to the first wheel, and an increased torque is applied to a second wheel of the plurality of wheels.

In some embodiments, the plurality of traction limits are determined based on vertical displacements of the plurality of wheels. In some embodiments, the plurality of traction limits are determined based on estimated friction corresponding to the plurality of wheels. In some embodiments, the plurality of traction limits are determined using a combination of vertical displacement and estimated friction corresponding to the plurality of wheels.

In some embodiments of the present disclosure, a vehicle is provided comprising a plurality of wheels and processing circuitry configured to determine a plurality of traction limits corresponding to each of the plurality of wheels. The processing circuitry is further configured to determine a grounded torque request, and distribute the grounded torque request to each of the plurality of wheels based on the plurality of traction limits. In some embodiments, the vehicle comprises a plurality of electric motors, each connected to a respective one of the plurality of wheels, and the grounded torque request is distributed by actuating the plurality of motors to provide respective torques to the plurality of wheels.

In some embodiments of the present disclosure, a non-transitory computer-readable medium is provided having non-transitory computer-readable instructions encoded thereon. The instructions cause a processor to determine a plurality of traction limits corresponding to each of a plurality of wheels. The instructions further cause the processor to determine a grounded torque request and distribute the grounded torque request to each of the plurality of wheels based on the plurality of traction limits.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

A vehicle equipped with a plurality of wheels may be operated by a driver who controls the speed of the vehicle. For example, when the driver wants to accelerate the vehicle, the driver may press on an accelerator pedal. However, if a torque to a wheel is too high and exceeds a traction limit of the wheel, wheel slip may occur. The traction limit of each wheel of the vehicle may be different, based on, for example, a vertical displacement of the wheel relative to the vehicle and the friction of a ground surface (e.g., that the wheel is on). For example, if one of the wheels of the vehicle drives over a large rock, a traction limit of a different wheel may significantly decrease, leading to wheel slip if the driver is demanding more torque from that wheel.

Provided herein are systems and methods for determining traction limits for the wheels of the vehicle, and based on the determined traction limits and a grounded torque request, distributing torque among the powered wheels to prevent the wheels from exceeding their traction limits and slipping. For example, for a first wheel of the plurality of wheels, if the torque to the first wheel approaches a traction limit of the first wheel, a further increase in the grounded torque request may have a smaller percentage distributed to the first wheel, and the increased percentage may be distributed to a second wheel of the plurality of wheels, preventing a slip of the first wheel.

Figure 1:
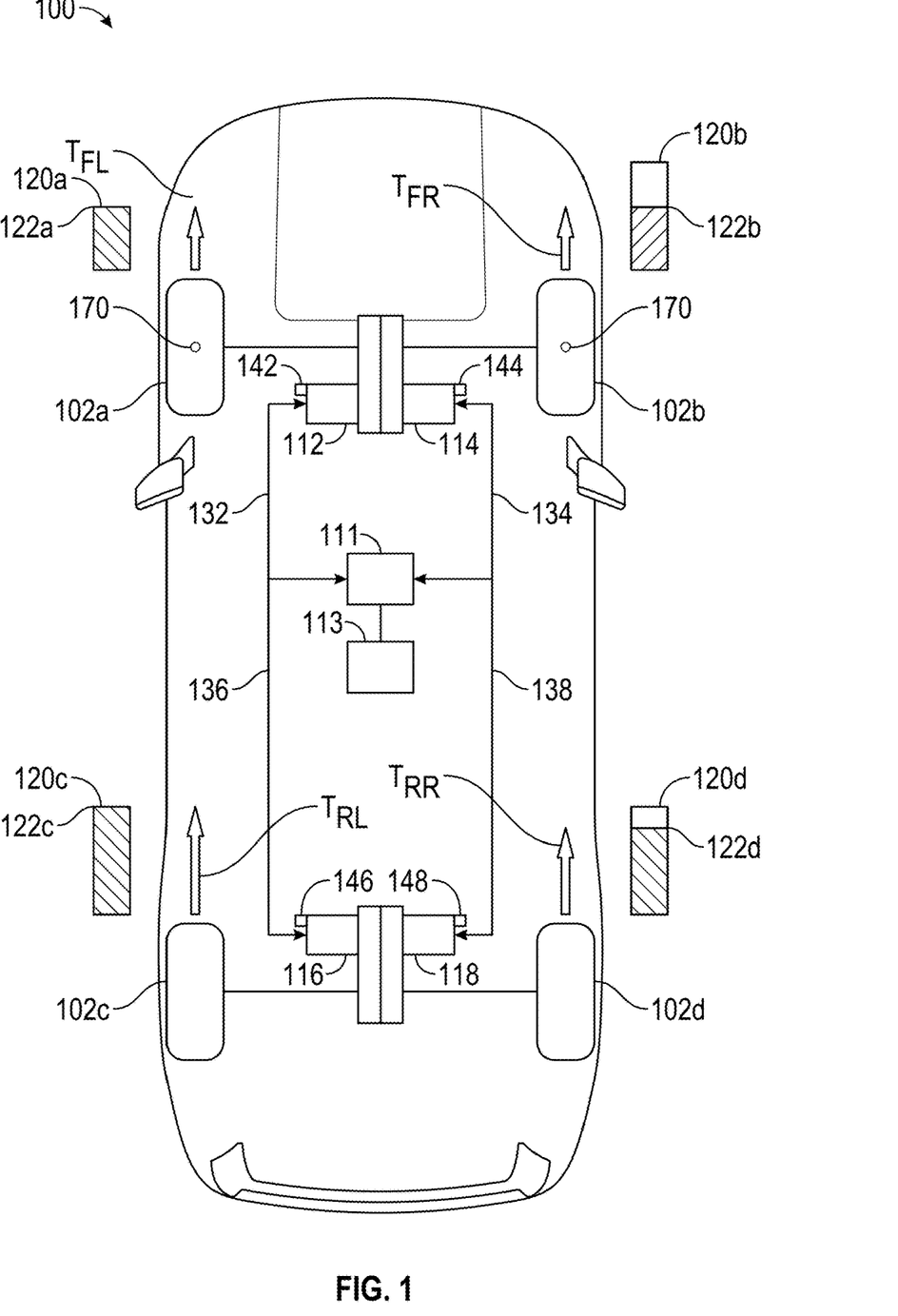
FIG. 1 shows a block diagram of an illustrative vehicle, in accordance with some embodiments of the present disclosure.

FIG. 1 shows a block diagram of an illustrative vehicle 100, in accordance with some embodiments of the present disclosure. In some embodiments, vehicle 100 may be a coupe, a sedan, a truck, a sport utility vehicle, a delivery van, a bus, or any other type of vehicle with two or more wheels. In some embodiments, vehicle 100 may include a front left wheel 102a, front right wheel 102b, rear left wheel 102c, and rear right wheel 102d.

In some embodiments, vehicle 100 may include a motor 112. Motor 112 may be connected to front left wheel 102a (e.g., via a belt, chains, gears, or any other connection device). Vehicle 100 may also include motors 114, 116, 118, which are similarly connected to wheels 102b, 102c, 102d, respectively. In some embodiments, motors 112, 114, 116, and 118 may be configured to provide forward torque or backward torque to their respective wheels 102a-102d. In some embodiments, vehicle 100 may include an accelerator pedal 113 configured to provide an accelerator pedal input to a vehicle dynamic controller 111 configured to convert the accelerator pedal input to a grounded torque request. In some situations, the grounded torque request based on the accelerator pedal increases and causes the vehicle 100 to accelerate. In other situations, the driver may keep the accelerator pedal 113 in a constant position, and the grounded torque request may also be constant, which can cause the vehicle 100 to travel at a relatively constant speed. In some embodiments, vehicle 100 may include a resolver 142 attached at motor 112 configured to monitor rotation of motor 112 and send a signal from the resolver 142 to the vehicle dynamic controller 111. Further, the vehicle dynamic controller 111 communicates with each resolver 142, 144, 146, 148 coupled at each respective motor (112, 114, 116, 118) via the respective communications lines (132, 134, 136, 138).

In some embodiments, motors 112, 114, 116, and 118 may be any kind of motors capable of generating power (e.g., gas motors, gas-electric hybrids motors, electric motors, battery-powered electric motors, hydrogen fuel cell motors). In some embodiments, motors 112, 114, 116, and 118 may be battery-powered electric motors configured to drive the wheels of vehicle 100 by utilizing a plurality of battery cells packaged together to create one or more battery modules or assemblies to store energy and release the energy upon request. In some embodiments, motors 112, 114, 116, and 118 may be devices connected to a primary single motor (not shown) and configured to independently transfer power from a single motor to wheels 102a-102d, respectively. For example, a differential may be used in combination with brakes or clutches to independently transfer torque to a pair of wheels driven by the differential. In some embodiments, vehicle 100 may have a single motor coupled to an axle (e.g., where a front axle connects front wheels 102a and 102b to a single front motor, or a rear axle connects rear wheels 102c and 102d to a single rear motor), and power provided from the single motor may be distributed to both wheels via a differential.

Figure 9:
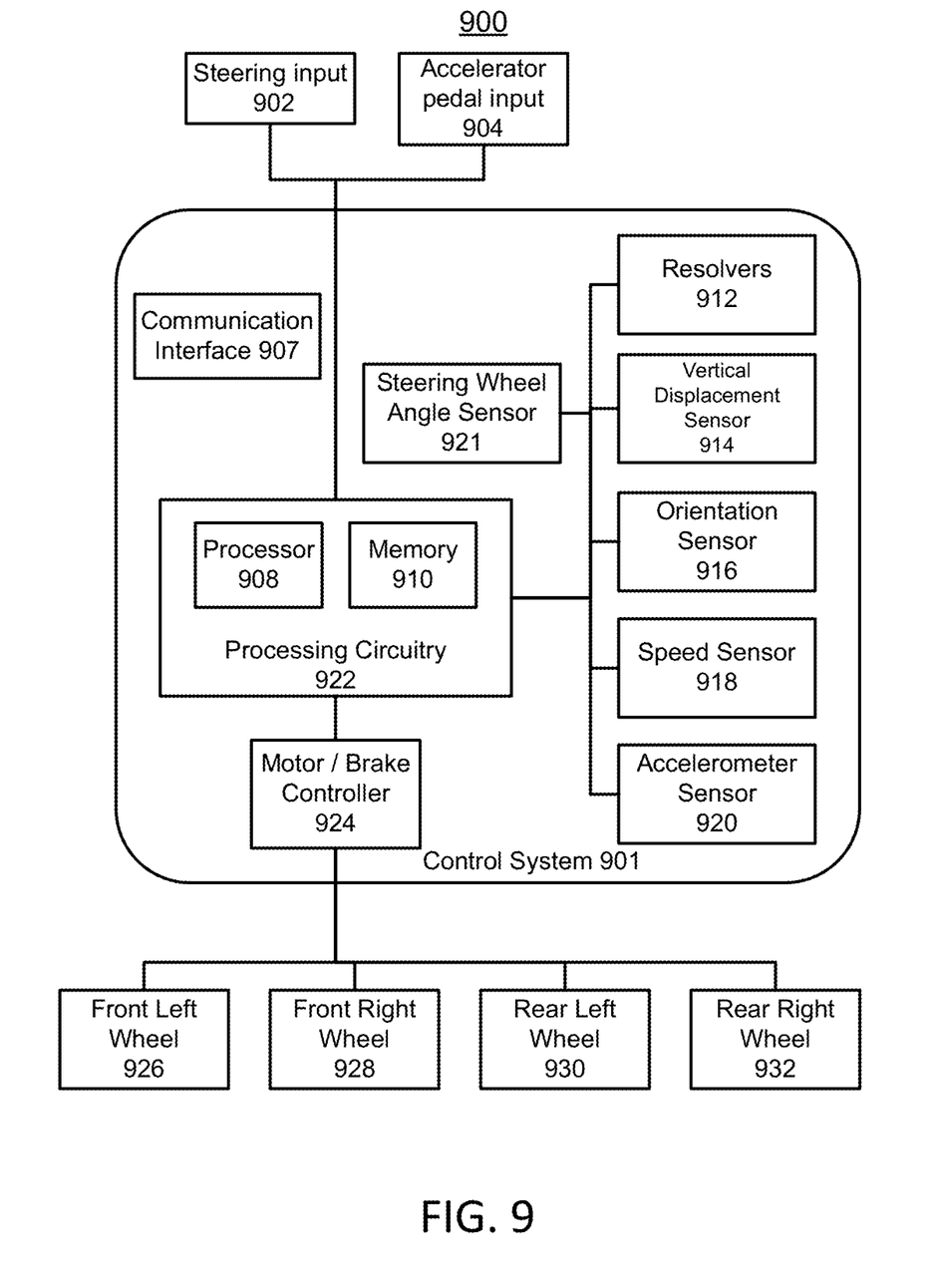
FIG. 9 depicts a system diagram of an illustrative system including control systems, input variables, and output variables, in accordance with several embodiments of the disclosure.

In some embodiments, vehicle 100 may include processing circuitry (e.g., processing circuitry 922, referenced in FIG. 9). In some embodiments, the processing circuitry may include an on-board vehicle computer that is capable of controlling multiple features or capabilities of the vehicles. In some embodiments, the processing circuitry may be communicatively connected with user inputs (e.g., accelerator pedal 113 or a graphical user interface) of the vehicle 100, sensors of the vehicle, and transitory or non-transitory memory (e.g., memory that stores instructions for operating the vehicle). In some embodiments, the processing circuitry is implemented as part of vehicle dynamic controller 111.

In some embodiments, vehicle 100 may include a plurality of sensors. For example, some of the plurality of sensors may include sensors for determining the speed of vehicle 100, the degree to which the front wheels 102a, 102b of vehicle 100 are turned (i.e., a steering angle of vehicle 100), the vertical displacements of wheels 102a-102d, wheel rotation sensors (e.g., resolvers 142, 144, 146, 148) to determine the wheel speed of each of the wheels 102a-102d of vehicle 100, and an accelerometer sensor.

In some embodiments, the processing circuitry of vehicle 100 may be capable of directly controlling features of vehicle 100 with or without user input. In one example, processing circuitry may distribute at least part of a grounded torque request to front left wheel 102a by actuating motor 112 to provide a specified amount of forward or backward torque to front left wheel 102a. Similarly, processing circuitry may distribute at least part of the grounded torque request to other wheels of the plurality of wheels 102b-102d by actuating any of motors 114, 116, 118 to provide a specified amount of forward or backward torque to wheels 102b-102d, respectively.

In some embodiments, front left wheel 102a, front right wheel 102b, back left wheel 102c, and back right wheel 102d may have individual traction limits 120a-120d, respectively. In some embodiments, the traction limit for each of the plurality of wheels may be determined based on a vertical displacement of the wheel relative to the vehicle 100, an estimated friction of a ground surface (e.g., that the respective wheel is on), or a combination thereof. As shown, a grounded torque request (e.g., determined based on accelerator pedal 113) is distributed to the plurality of wheels as torques 122a-122d. Torques 122a-122d correspond to the torques applied to the front left wheel 102a (e.g., $T_{FL}$), the front right wheel 102b (e.g., $T_{FR}$), the back left wheel 102c (e.g., $T_{BL}$), and the back right wheel 102d (e.g., $T_{BR}$), respectively. As the grounded torque request increases, the torque applied to each powered wheel generally increases. For example, the grounded torque request may be split evenly between the powered wheels. However, an increase in a grounded torque request may result in an increase in torque for a wheel that approaches or even exceeds the traction limit of the wheel. Therefore, in accordance with the present disclosure, the grounded torque request may be distributed such that torque for a particular wheel is reduced to prevent the traction limit for that wheel from being exceeded and the amount of reduction is applied as excess torque to a different wheel of the plurality of wheels. As shown, for example, torque 122a being applied to front left wheel 102a is equal to traction limit 120a and torque 122c applied to rear left wheel 102c is equal to traction limit 120c. Therefore, an increase in the grounded torque request applied to the front left wheel 102a (or rear left wheel 102c) may instead be distributed to, for example, back right wheel 102d, whose torque 122d does not exceed the wheel's traction limit 120d.

In accordance with some embodiments of the present disclosure, the distribution of the grounded torque request may be based on the plurality of traction limits. For example, on a relatively even ground surface, the grounded torque request may be distributed equally to the wheels 102a-102d provided the tractions limits are not reached. As another example, on a relatively even ground surface, vehicle 100 may consider a payload in vehicle 100 when determining how to distribute a grounded torque request to the wheels 102a-102d. For example, if vehicle 100 is carrying a heavy load in the rear of vehicle 100, the grounded torque request may be distributed unevenly between the front wheels 102a, 102b and the rear wheels 102c, 102d. Because the rear of the vehicle has a heavier payload weight, the weight at each wheel 102a-102d will differ (e.g., the rear wheels 102c and 102d will carry more weight), and the vertical displacement of each wheel to the vehicle 100 may differ. Specifically, rear wheels 102c and 102d will have lower vertical displacements compared to that of front wheels 102a and 102b, and based on the lower vertical displacements, vehicle 100 may determine that rear wheels 102c and 102d have higher traction limits than that of front wheels 102a and 102b. Based on the traction limits determined for the wheels, the distribution of the grounded torque request to the rear wheels 102c and 102d may be higher.

The foregoing FIG. 1 is merely illustrative of the principles of this disclosure, and various modifications may be made by those skilled in the art without departing from the scope of this disclosure. The above-described embodiments are presented for purposes of illustration and not of limitation. For example, any combination of motors 112, 114, 116, and 118 and drivetrains may be used in vehicle 100 in accordance with the present disclosure. In some examples, the rear motors 116 and 118 of FIG. 1 may be used in combination with a single front motor 112. According to such a configuration, vehicle 100 includes three motors (one front motor and two rear motors). In another example, a single rear motor 116 may be used in combination with the two front motors 112 and 114 of FIG. 1. According to such a configuration, vehicle 100 includes three motors (two front motors and one rear motor).

Figure 2:
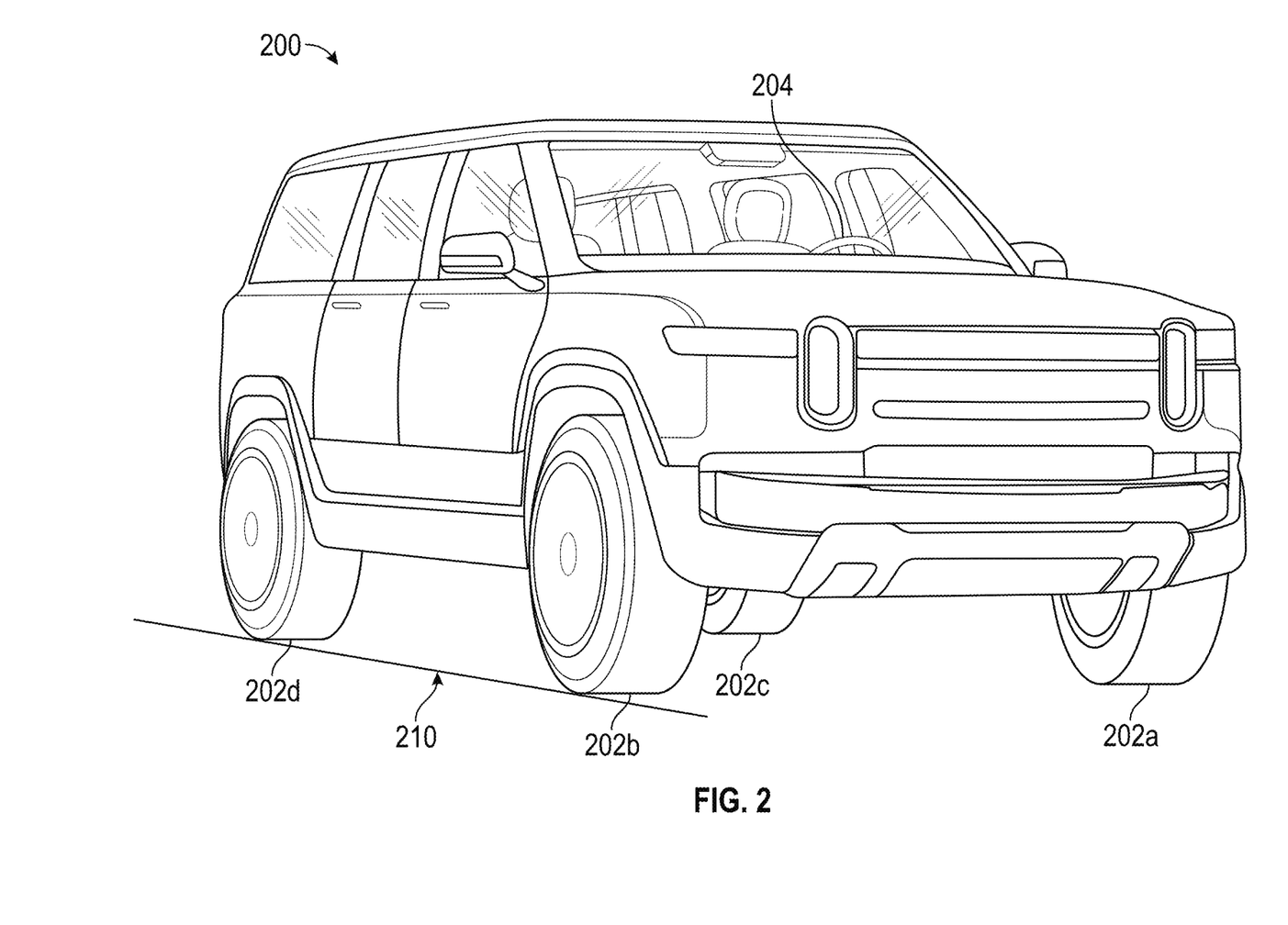
FIG. 2 shows an illustrative vehicle driving on a level surface, in accordance with some embodiments of the present disclosure.

FIG. 2 shows an illustrative vehicle 200 driving on a level surface 210, in accordance with some embodiments of the present disclosure. In some embodiments, vehicle 200 may be a coupe, a sedan, a truck, a sport utility vehicle, a delivery van, a full size van, a minivan, a bus, or any other type of vehicle with two or more wheels. In some embodiments, vehicle 200 corresponds to vehicle 100 of FIG. 1. Vehicle 200 includes at least a steering wheel 204 and a plurality of wheels. As shown, for example, the plurality of wheels includes a front left wheel 202a, a front right wheel 202b, a back left wheel 202c, and a back right wheel 202d. Level surface 210 may be any surface that does not have uneven bumps (e.g., rocks or potholes on the road) and is not sloped, such as a road or dry pavement, or other suitable driving surfaces. It will be understood that additional components may be added, removed, or substituted in to FIG. 2 in other embodiments.

In some embodiments, vehicle 200 may be provided a grounded torque request. For example, the grounded torque request may be provided by a user operating (e.g., driving) the vehicle 200 when the user presses on an accelerator pedal of the vehicle 200 (e.g., accelerator pedal 113). The torque request may be distributed between two or more of wheels 202a-202d. For example, when vehicle 200 comprises four motors, one for each of wheels 202a-202d, the torque request may be distributed between all four wheels. As the driver increases the torque request, increased torque may be applied to each of wheels 202a-202d, which causes vehicle 200 to accelerate and the wheels to rotate at a faster rate.

When vehicle 200 is on the level surface 210, the torque request may be split evenly among each of the wheels. In some embodiments, depending on the type of vehicle, a weight distribution of the vehicle, one or more desired driving dynamics, or other suitable parameters, torque may be split unevenly between the front wheels 202a, 202b and the back wheels 202c, 202d of vehicle 200. For example, the front wheels 202a, 202b may receive 40% of the torque request (with 20% provided to each front wheel), and 60% of the torque request may be split evenly between the two rear wheels 202c, 202d. In some embodiments, based on a position of steering wheel 204, which corresponds to a steering angle of front wheels 202a, 202b, the torque request may be split unevenly between the left wheels 202a, 202c and the right wheels 202b, 202b of vehicle 200 as well (e.g., for torque vectoring).

Vehicle 200 may determine a plurality of traction limits corresponding to wheels 202a-202d. In some embodiments, the traction limit corresponds to the maximum torque that vehicle 200 can apply to the respective wheels (e.g., to limit or prevent wheel slip). The respective traction limit for each the plurality of wheels 202a-202d may be determined based on at least a vertical displacement of the respective wheel, a friction estimate of the surface that the vehicle is on, or a combination thereof. For example, on level surface 210, if the vehicle 200 is not turning and the friction across the level surface 210 is the same, then the traction limit for each wheel may be the same. The traction limit for each wheel may also be determined in some embodiments based on the position of steering wheel 204, or based on the weight distribution of the vehicle 200 (e.g., if the vehicle 200 is on a sloped surface, the traction limits may be different between the front and the back wheels).

If the torque on a wheel exceeds its respective traction limit, vehicle 200 may be in a slip state, which may not be desirable. Therefore, in some embodiments of the present disclosure, in order to prevent a wheel of vehicle 200 from slipping, torque may be redistributed from a first wheel of the plurality of wheels (e.g., one of wheels 202a-202d) to one or more of the other wheels of the plurality of wheels if the torque of the first wheel approaches the respective traction limit of the first wheel.

Figure 3:
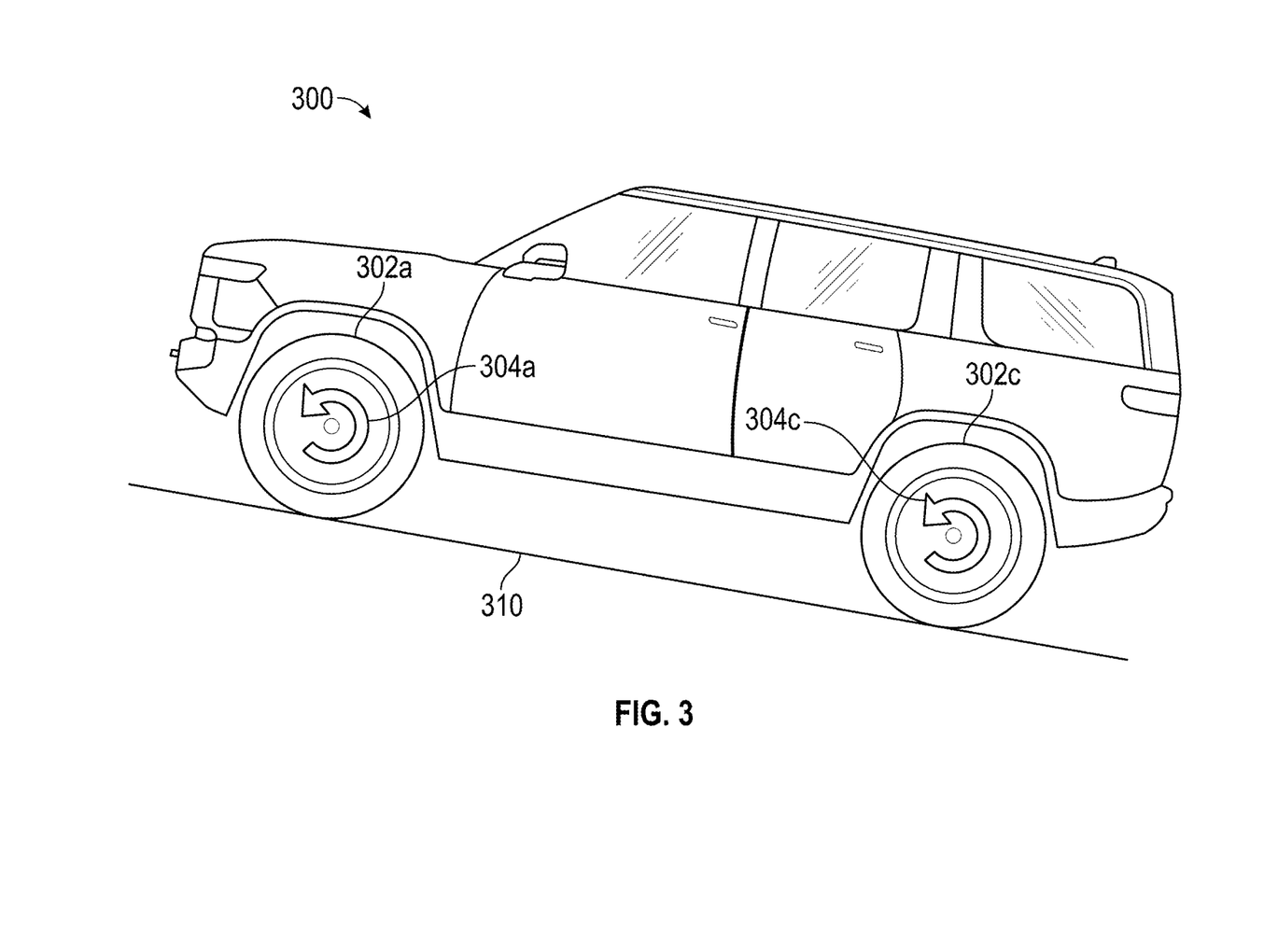
FIG. 3 shows an illustrative vehicle driving on a sloped surface, in accordance with some embodiments of the present disclosure.

FIG. 3 shows an illustrative vehicle 300 driving on a sloped surface 310, in accordance with some embodiments of the present disclosure. In some embodiments, vehicle 300 corresponds to vehicle 200 of FIG. 2, and includes a plurality of wheels that correspond to the plurality of wheels 202a-202d, respectively. In some embodiments, sloped surface 310 may be an incline, decline, bank, or a combination thereof.

While driving on sloped surface 310, weight distribution in vehicle 300 may not be even (e.g., due to the force of gravity on vehicle 300, items in the vehicle 300 shifting in response to the slope, or a combination thereof). For example, the vehicle 300 may be in an incline position as shown, with more weight therefore being supported by the rear wheels of the vehicle. In some embodiments, the inclined position includes the front wheels of the vehicle being in a higher position than rear wheels or the rear wheels of the vehicle being in a higher position than the front wheels. For example, the vehicle may be on a hill with a front of the vehicle being higher than a rear of the vehicle. Alternatively, the vehicle may be on a declined slope, with the rear of the vehicle being higher than the front of the vehicle. In some embodiments, the banked position includes left wheels 302a and 302c of the vehicle being in the higher position than the right wheels (not shown, but may for example be the wheels 202b and 202d in FIG. 2). For example, the vehicle being on a hill sideways, the left side of the vehicle being higher than the right side of the vehicle.

In the embodiment shown in FIG. 3, the front wheels of vehicle 300 are higher than the rear wheels of vehicle 300, and as a result more torque is distributed to the rear wheels of vehicle 300. As shown, wheel torques 304a and 304c represent the torques being applied to the front wheels (e.g., front left wheel 302a and the front right wheel not shown) and to the rear wheels, respectively. The larger arrow for the rear wheel torque 304c (e.g., compared to the arrow size for the front wheel torque 304a) represents a higher torque on the rear wheels compared to the torque of the front wheels. Furthermore, because more weight is on the rear of the vehicle due to the inclined slope, the rear suspension may be compressed, which causes the rear wheels to have a shorter distance to the vehicle body (e.g., a smaller vertical displacement) than that of the front wheels. Additionally, the force of friction on the rear wheels is also higher due to the increased load on the rear of the vehicle. Because the traction limit of each wheel can be based on the vertical displacements of the wheels and the estimated friction, the rear wheels will not slip even with the increased torque (e.g., because traction limits of the rear wheels will be higher than that of the front wheels).

Figure 4:
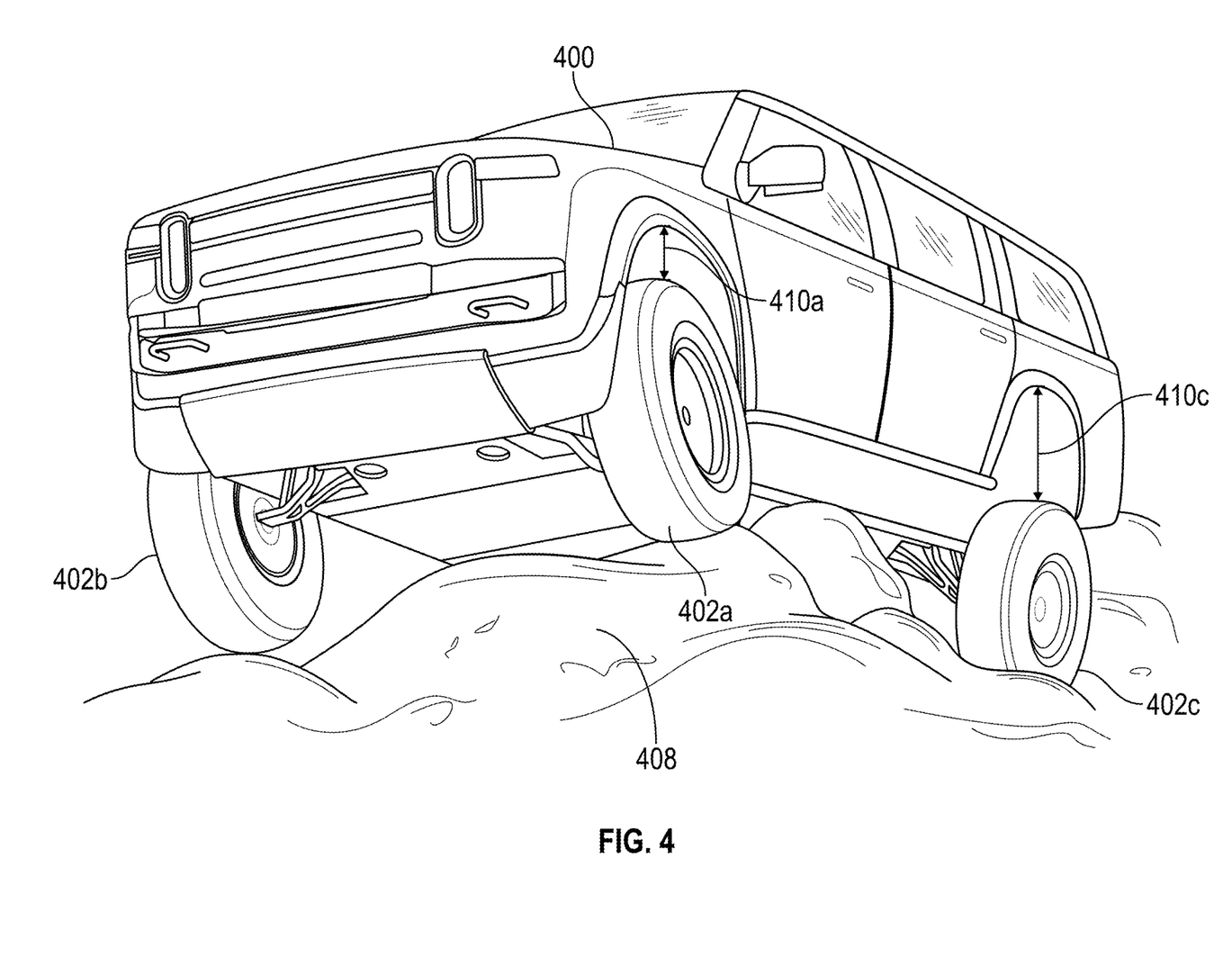
FIG. 4 shows an illustrative vehicle driving over a bumpy ground surface, in accordance with some embodiments of the present disclosure.

FIG. 4 shows an illustrative vehicle 400 driving over a bumpy ground surface, in accordance with some embodiments of the present disclosure. It will be understood that similar to FIG. 3, vehicle 400 may correspond to vehicle 200 of FIG. 2. The vehicle 400 as shown is driving over a large rock 408, such that the front left of vehicle 400 is raised, with the suspension corresponding to wheel 202a highly compressed.

In some embodiments, when traveling over the rock 408, the wheel resting on the rock (e.g., front left wheel 402a) has a much lower vertical displacement 410a than the other wheels of vehicle 400, such as front right wheel 402b. Because there is a much higher load on the front left wheel 402a than on the front right wheel 402b, the determined traction limit of front left wheel 402a will be much higher than the determined traction limit of wheel 402b. Thus, if a grounded torque request is evenly split across the plurality of wheels of vehicle 400, then the torque applied to the front right wheel 402b will likely exceed the traction limit of that wheel, causing a slip.

Therefore, in some embodiments of the present disclosure, upon determining that the grounded torque request to the front right wheel 402b is approaching its determined traction limit, the grounded torque request may be distributed from the front right wheel 402b to the other wheels of vehicle 400. For example, the grounded torque request to wheel 402b may be decreased (e.g., to prevent the wheel from slipping), and the grounded torque request to rear right wheel may be increased. In some embodiments, however, the rear right wheel may also be determined to be approaching a respective traction limit and may not be able to handle all of the increased grounded torque request. Therefore, not all of the increased grounded torque request may be shifted to the rear right wheel, and the increased grounded torque request may also be partly distributed to back left wheel 402c, such that none of the wheels exceed the traction limit and slip. In some embodiments, an increased torque request may first be shifted to a wheel on the same side of the vehicle (e.g., from front right wheel 402b to the right wheel in the embodiment shown in FIG. 4), and then to a wheel on a different side of the vehicle (e.g., from front right wheel 402b to back left wheel 402c, if the increased grounded torque request to the rear right wheel 402d would exceed its traction limit).

In some embodiments, vehicle 400 may include an onboard system that is capable of accessing prior information, such as regarding previous wheel slips (e.g., of other vehicles sharing a cloud system with vehicle 400), weather information in the region that vehicle 400 is driving in, or a combination thereof. The prior information may be used (e.g., by processing circuitry in the onboard system) in order to calculate an estimated friction of a ground surface (e.g., that vehicle 400 is currently driving on) in order to more accurately determine the traction limits for the plurality of wheels.

Figure 5:
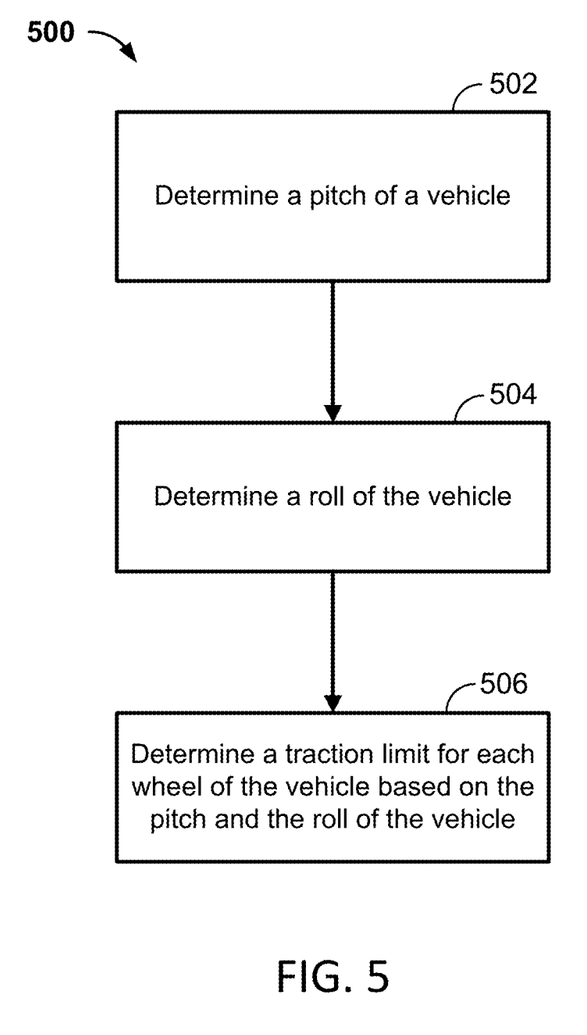
FIG. 5 shows an illustrative flowchart for determining a plurality of traction limits corresponding to a plurality of wheels based on a pitch and/or a roll of a vehicle, in accordance with some embodiments of the present disclosure.

FIG. 5 shows an illustrative flowchart 500 for determining a plurality of traction limits corresponding to a plurality of wheels based on a pitch and/or a roll of a vehicle, in accordance with some embodiments of the present disclosure. The plurality of the traction limits may be calculated, for example, by processing circuitry onboard the vehicle. In some embodiments, the vehicle may be vehicle 200 (or similar thereto) as described in FIG. 2. Although FIG. 5 is described in the context of the particular structures, components, and processing of the present disclosure, and although a particular order and flow of steps are depicted in FIG. 5, it will be understood that in some embodiments, one or more of the steps may be modified, moved, removed, or added, and that the order of steps depicted in FIG. 5 may be modified.

Processing begins at step 502, where a pitch of a vehicle is determined. The pitch of the vehicle is the rotational position of the vehicle relative to a transverse axis. Processing circuitry may determine the pitch based on an accelerometer sensor (e.g., accelerometer sensor 920 of FIG. 9), an orientation sensor (e.g., orientation sensor 916 of FIG. 9), or vertical displacement sensors 914 of FIG. 9). For example, as shown in FIG. 3, when the vehicle drives on inclined slope 310 (i.e., where the front wheels of the vehicle are higher than the rear wheels of the vehicle), the vehicle has a positive pitch, which is higher than if the vehicle were driving on, for example, the level surface 210 as described in FIG. 2. Conversely, if the vehicle drives on a declined slope (i.e., where the rear wheels are higher than the front wheels), the vehicle has a negative pitch, which is lower than if the vehicle was driving on either the level surface 210 or the inclined slope 310. Processing may then continue to step 504.

At step 504, a roll of the vehicle is determined. The roll of the vehicle is the rotational position of the vehicle relative to a longitudinal axis. Similar to step 502, processing circuitry may determine the roll based on an accelerometer sensor (e.g., accelerometer sensor 920 of FIG. 9), an orientation sensor (e.g., orientation sensor 916 of FIG. 9), or vertical displacement sensors 914 of FIG. 9). For example, as shown in FIG. 4, when the vehicle drives over a rock, or other suitable sloped surface, such that wheels on one side of the vehicle (e.g., the left side as shown in FIG. 4) are higher than wheels on the other side of the vehicle, the vehicle is rolled towards one side. Processing may then continue to step 506.

At step 506, a traction limit for each wheel of a vehicle is determined based on the roll and the pitch of the vehicle. For example, if the vehicle is pitched upwards, as shown in FIG. 3, the traction limits for the rear wheels on the vehicle may be higher than the traction limits for the front wheels. Conversely, if the vehicle is pitch downwards (e.g., when the vehicle drives on a declined slope), the traction limits for the front wheels may be higher than the traction limits for the rear wheels. If the vehicle is rolled to one side, the wheels on that side are lower and may have higher traction limits than the wheels on the other higher side. In some embodiments, the vehicle may have a pitch and a roll, and the traction limits to each respective wheel may be calculated based on the combination of the pitch and the roll of the vehicle. The traction limits may be determined based on a lookup table or a mathematical model that represents how pitch and roll affect the traction at each wheel. For example, pitch and roll affect the load at each wheel, which in turn affects the traction at each wheel.

Figure 6:
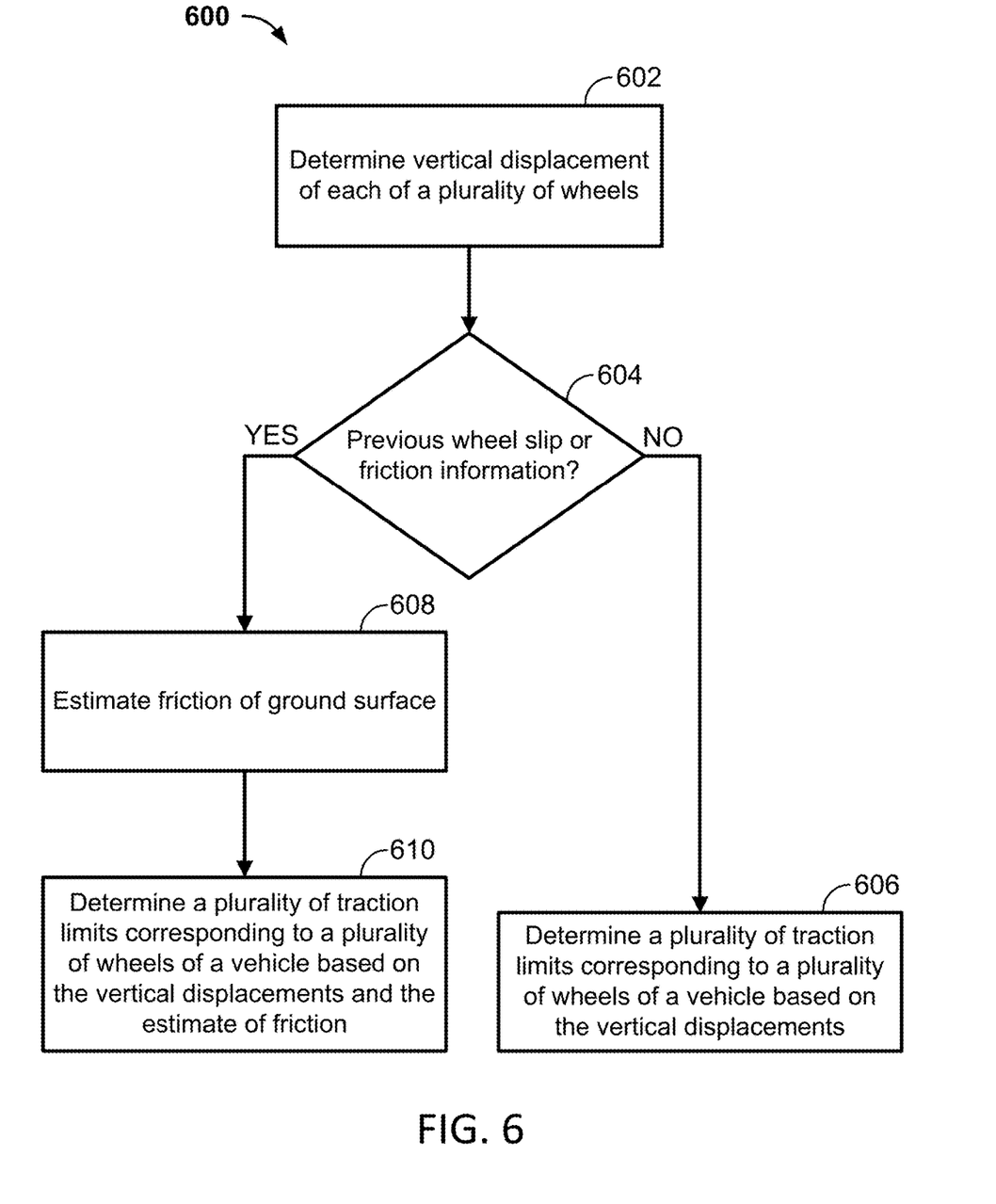
FIG. 6 shows an illustrative flowchart for determining a plurality of traction limits corresponding to wheels of a vehicle based on vertical displacements of the wheels, in accordance with some embodiments of the present disclosure.

FIG. 6 shows an illustrative flowchart 600 for determining a plurality of traction limits corresponding to wheels of a vehicle based on vertical displacements of the wheels, in accordance with some embodiments of the present disclosure. It will be understood that the steps of flowchart 500 and the steps of flowchart 600 both describe processes for determining the plurality of traction limits, and either process, or a combination thereof (e.g., if more accuracy in the calculated traction limits is desired) may be utilized in order to determine the plurality of traction limits. Although FIG. 6 is described in the context of the particular structures, components, and processing of the present disclosure, and although a particular order and flow of steps are depicted in FIG. 6, it will be understood that in some embodiments, one or more of the steps may be modified, moved, removed, or added, and that the order of steps depicted in FIG. 6 may be modified.

Processing begins at step 602, where the vertical displacement of each of a plurality of wheels is determined. The vertical displacement of a wheel may be a distance from a wheel to a body of the vehicle. The vertical displacement may be determined based on any sensor (e.g., vertical displacement sensor 914 such as a ride height sensor) that detects a distance between the ground or wheel and a point on the vehicle body or the vehicle suspension. For example, in the illustrative example shown in FIG. 4, when a front left wheel of a vehicle is driving over a large rock, the vertical displacement of the front left wheel is smaller than the vertical displacements of the other wheels of the plurality of wheels on the vehicle. As shown, the front left wheel has vertical displacement 410a, which is smaller than, for example, vertical displacement 410c of a back left wheel 402c. Processing may then continue to step 604.

At step 604, previous wheel slip or friction information is determined. In some embodiments, the vehicle may include a vehicle dynamics module that is connected wirelessly to a cloud system, such that the vehicle is a first vehicle and the cloud system is also in communication with other vehicles (e.g., a second vehicle). If the second vehicle previously experienced wheel slip on a ground surface, the second vehicle may transmit the location of where the wheel slip occurred to the cloud system. When the first vehicle is driving in the same location over the same surface, the cloud system made provide the first vehicle with the previous slip information. In some embodiments, additional information, such as meteorological data about the location of the vehicle, other relevant information, or a combination thereof may be used to provide friction information to the vehicle as well. For example, meteorological data indicating rain at the location indicates that the ground friction is lower. If previous wheel slip or friction information is not available ("NO" to step 604), then processing continues to step 606.

If previous wheel slip and/or friction information is available ("YES" to step 604), then processing continues to step 608.

At step 606, a plurality of traction limits corresponding to a plurality of wheels of a vehicle are determined based on the vertical displacements of each respective wheel. For example, as described in the illustrative example in FIG. 3, for a vehicle travelling uphill on an inclined slope (e.g., front wheels of the vehicle are higher than rear wheels), an increased load will be applied to the rear wheels due to gravity, which in turn results in a lower vertical displacement of the rear wheels compared to that of the front wheels. Therefore, the traction limits for the rear wheels will increase and the traction limits for the front wheels will be decreased. In the example depicted in FIG. 4, as a front left wheel 402a of the vehicle 400 drives over a large rock 408, the vertical displacement of the front left wheel will be smaller than a vertical displacement of a front right wheel 402b of the vehicle 400. Therefore, the traction limit of the front left wheel 402a will be determined to be higher than the traction limit of the front right wheel 402b. The traction limits may be determined based on a lookup table or a mathematical model that represents how vertical displacement of each wheel affects the traction at each wheel.

At step 608, if previous wheel slip or friction information was determined in step 604, an estimated friction of a ground surface is determined. For example, on a level surface, if a previous slip was recorded (e.g., from a different vehicle), the traction limits of the plurality of wheels may be reduced, even if the vertical displacements of the plurality of wheels remain the same. In some embodiments where meteorological data is provided, weather conditions may indicate or suggest a change in the friction of the ground surface. For example, if meteorological data indicates that there is rain in the location of the vehicle, the traction limits of the vehicle may be reduced due to an estimated lower friction of a wet ground surface. Processing then continues to step 610.

At step 610, a plurality of traction limits corresponding to a plurality of wheels are determined based on the vertical displacements of each wheel and the estimate of friction. For example, a vehicle driving on a level surface (e.g., vertical displacements of the wheels are the same) may have equal traction limits, and the traction limit of each wheel may be lowered when the estimate of friction is lower (e.g., when meteorological data indicates that, for example, the ground surface is wet (e.g., due to rain)). As another example, the vehicle may be driving uphill as previously described, and the plurality of traction limits may be higher for the rear wheels than the front wheels based on the vertical displacements. When the vehicle travels on a ground surface in a location where a previous slip was recorded, each traction limit may be reduced (e.g., because the previous slip indicates a lower estimated friction of the ground surface). In some embodiments, at step 610, the plurality of traction limits are first determined the same way as they are determined at step 606, and then the traction limits are scaled based on the friction estimate. For example, if the friction estimate is reduced by 10% due to previous slip information, the traction limits are then similarly scaled down by 10%.

Figure 7:
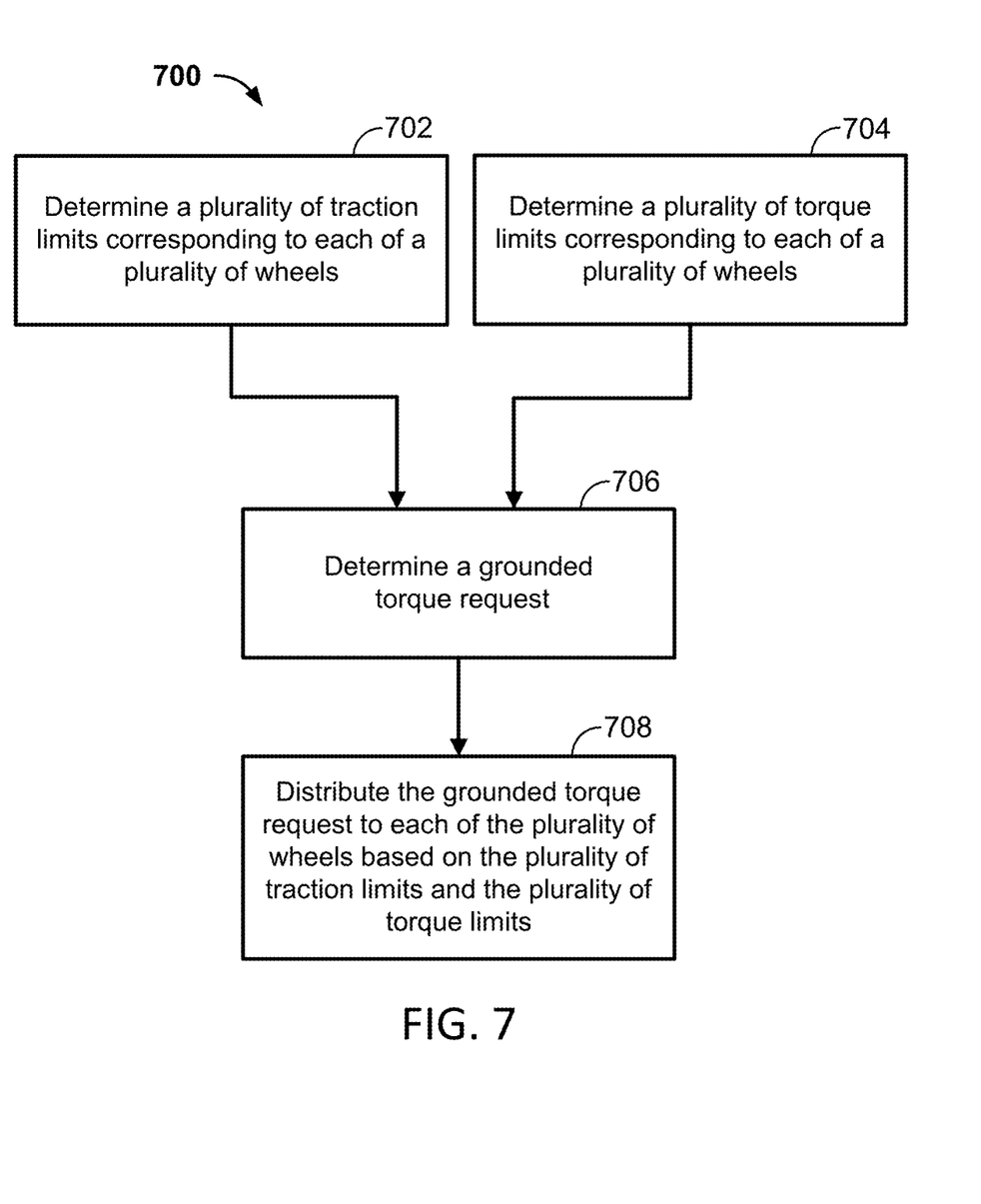
FIG. 7 shows an illustrative flowchart of steps for distributing a grounded torque request to each of a plurality of wheels of a vehicle, in accordance with some embodiments of the present disclosure.

FIG. 7 shows an illustrative flowchart 700 of steps for distributing a grounded torque request to each of a plurality of wheels of a vehicle, in accordance with some embodiments of the present disclosure. The vehicle may be, for example, the vehicle 200 of FIG. 2, and the steps of flowchart 700 may be executed by processing circuitry onboard the vehicle. Although FIG. 7 is described in the context of the particular structures, components, and processing of the present disclosure, and although a particular order and flow of steps are depicted in FIG. 7, it will be understood that in some embodiments, one or more of the steps may be modified, moved, removed, or added, and that the order of steps depicted in FIG. 7 may be modified.

Processing begins at step 702, where a plurality of traction limits corresponding to each of a plurality of wheels are determined. It will be understood that each wheel of the plurality of wheels has a corresponding traction limit. In one example, two traction limits are determined for a two-wheel drive vehicle, one for each powered wheel. As another example, four traction limits are determined for a four-wheel drive vehicle, one for each powered wheel. In some embodiments, the plurality of traction limits are determined using the steps of flowchart 500 of FIG. 5 or the steps of flowchart 600 of FIG. 6. Processing may then continue to step 704.

At step 704, a plurality of torque limits corresponding to each of a plurality of wheels are determined. In some embodiments, the plurality of torque limits may be determined by a user selection (e.g., a user may lower the torque limits to each wheel in order to decrease the maximum possible speed of the vehicle). In some embodiments, the plurality of torque limits may be determined based on a vehicle mode. For example, the vehicle may be in a mode having a raised ride height, where the body of the vehicle is higher than when the vehicle is in a normal or all-purpose mode. When the vehicle has a raised ride height, the plurality of torque limits may be decreased.

At step 706, a grounded torque request is determined. In some embodiments, the grounded torque is determined based on a position of an accelerator pedal of a vehicle (e.g., accelerator pedal 113 of vehicle 100, shown in FIG. 1). In some embodiments, a driver of the vehicle may press on the accelerator pedal in order to accelerate the vehicle. For example, pressing the accelerator pedal down further (e.g., when the driver wants the vehicle to speed up) provides a higher grounded torque request than if the pedal was lightly pressed. In some embodiments, the grounded torque is determined by an autonomous driving module. Processing may then continue to step 708.

At step 708, the grounded torque request determined in step 706 is distributed to each of the plurality of wheels based on the plurality of traction limits and the plurality of torque limits. In some embodiments, the distribution of the grounded torque request to each wheel may be based on the lower limit of the respective traction limit and the respective torque limit. In some embodiments, step 704 is omitted and the grounded torque request is distributed based on the plurality of traction limits. In some embodiments, the grounded torque request may initially be evenly distributed to each wheel of the plurality of wheels (e.g., the wheels that are powered, which may be two or four wheels). However, if torque to a first wheel is approaching or exceeds the traction limit (e.g., the first wheel may have a lower traction limit than other wheels of the plurality of wheels as a result of a larger vertical displacement), then a reduced torque may be applied to the first wheel, and the amount of torque that was reduced may be distributed to at least one of the other wheels. In some embodiments, the reduction of torque may be a function of how close the torque for the wheel is compared to the respective traction limit of the wheel. For example, as torque for a wheel approaches its traction limit, a decreasing percentage of an increase in the grounded torque request may be distributed to that wheel.

Referring back to FIG. 1, vehicle 100 includes motors 112, 114, 116, and 118 controlling corresponding wheels 102a-102d, respectively. In vehicle 100, applying a reduced amount of torque to, for example, rear left wheel 102c may include reducing the power of motor 116 (e.g., by reducing the motor current when motor 116 is an electric motor) in order to decrease torque to the rear left wheel 102c. The reduced amount of torque may then be distributed by increasing the power of motor 118 (e.g., by increasing the motor current when motor 118 is an electric motor), which causes an increased amount of torque to be applied to rear right wheel 102d. In some embodiments, vehicle 100 may have a single motor coupled to an axle (e.g., where a front axle connects front wheels 102a and 102b to a single front motor, or a rear axle connects rear wheels 102c and 102d to a single rear motor), and power provided from the single motor may be distributed to both wheels via a differential. Redistributing torque between two wheels connected via a differential may include applying a brake to one of the wheels and optionally increasing the power of the motor, such that torque is reduced to the braked wheel and torque is increased to the non-braked wheel.

In some embodiments, the distribution of the grounded torque request may be further based on a steering angle of the vehicle. For example, if the driver of the vehicle turns a steering wheel (e.g., steering wheel 204) in a left direction, the vehicle may turn left, and distributing the grounded torque request may include applying a lower torque to the front left wheel compared to the torque applied to the front right wheel (e.g., such that the torque to each wheel does not exceed the respective traction limit of the wheel) to help turn the vehicle to the left.

It will be understood that the method of FIG. 7 will be continuously repeated during operation of a vehicle. Over time, the torque limits and/or traction limits may change (e.g., even if the grounded torque request does not, such as when a driver of the vehicle maintains the vehicle at a constant speed). For example, as the vehicle travels over a bumpy road and the vertical displacements of the wheels change, the corresponding tractions limits may also change. Accordingly, even if the grounded torque request remains constant over time, changes in the road surface can cause torque to be distributed differently over time to prevent the traction limits from being exceeded.

Figure 8:
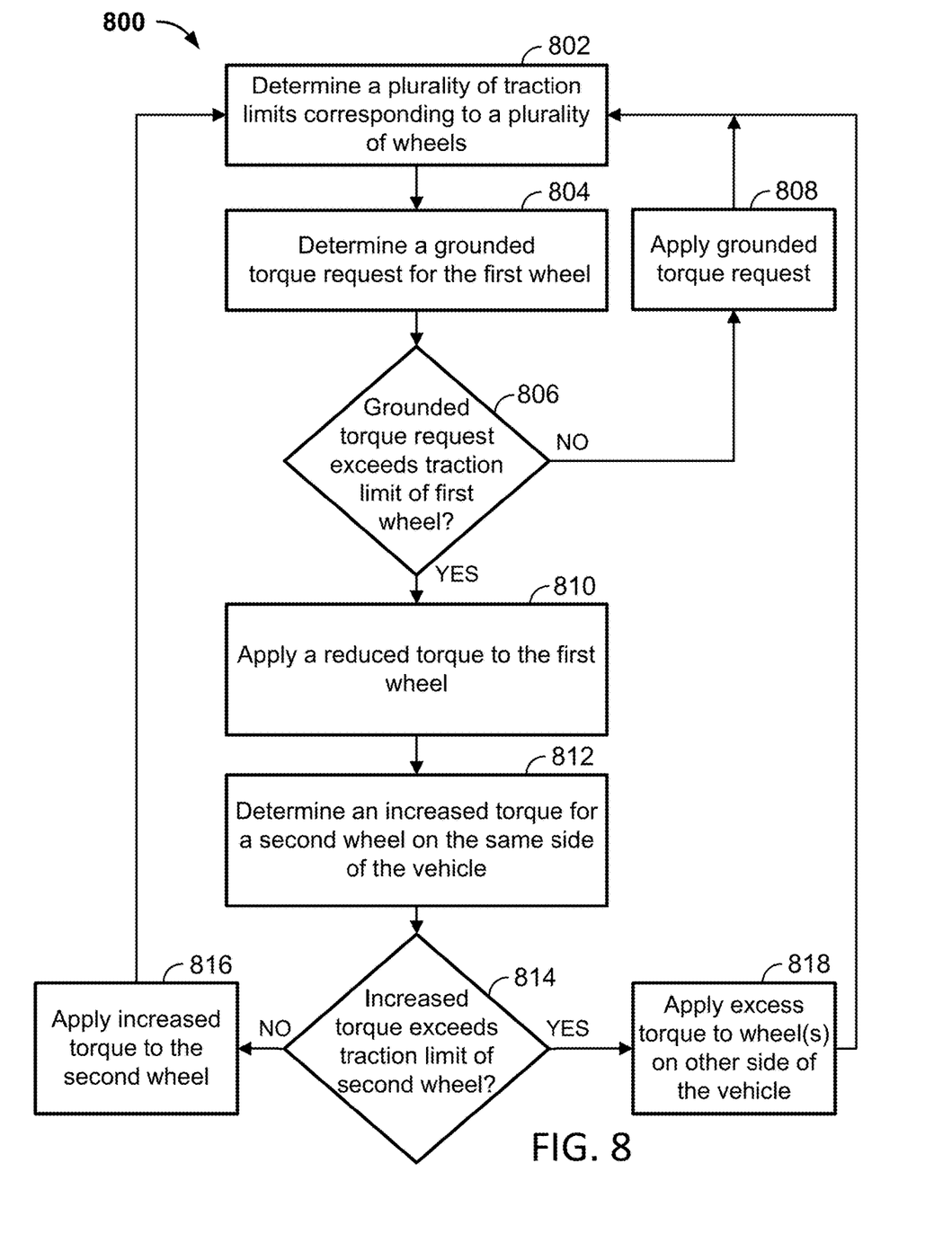
FIG. 8 shows an illustrative flowchart of steps for distributing a grounded torque request to a plurality of wheels of a vehicle, in accordance with some embodiments of the present disclosure.

FIG. 8 shows an illustrative flowchart 800 of steps for distributing a grounded torque request to a plurality of wheels of a vehicle, in accordance with some embodiments of the present disclosure. The steps in flowchart 800 may detail and/or describe some embodiments of step 708 of FIG. 7 where a grounded torque is distributed as a wheel approaches its traction limit. In some embodiments, the steps of flowchart 800 may be executed by processing circuitry onboard the vehicle. Although FIG. 8 is described in the context of the particular structures, components, and processing of the present disclosure, and although a particular order and flow of steps are depicted in FIG. 8, it will be understood that in some embodiments, one or more of the steps may be modified, moved, removed, or added, and that the order of steps depicted in FIG. 8 may be modified.

Processing begins at step 802, where a traction limit for a first wheel of a plurality of wheels is determined. In some embodiments, a plurality of traction limits may be calculated for each wheel of the plurality of wheels, as described in step 702 of FIG. 7, thereby also determining the traction limit of the first wheel. Processing may then continue to step 804.

At step 804, a grounded torque request for the first wheel is determined. In some embodiments, a grounded torque request for the plurality of wheels is determined, thereby also determining the grounded torque request for the first wheel. For example, the grounded torque request may be determined based on a default or initial distribution of torque (e.g., evenly splitting the grounded torque request among each wheel of the plurality of wheels). Processing may then continue to step 806.

At step 806, the vehicle (e.g., processing circuitry onboard the vehicle) determines if the grounded torque request for the first wheel exceeds the traction limit of the first wheel. If the grounded torque request for the first wheel does not exceed the traction limit ("NO" to step 806), then processing continues to step 808. If the grounded torque request for the first wheel exceeds the traction limit ("YES" to step 806), processing continues to step 810.

At step 808, the grounded torque request to the first wheel is applied, and processing returns to step 802 where process 800 is repeated for the next grounded torque request.

At step 810, a reduced torque is applied to the first wheel. The reduction in torque to the first wheel is at least large enough of a reduction such that the reduced grounded torque request to the first wheel does not exceed the traction limit of the first wheel. Processing then continues to step 812.

At step 812, after reducing the applied torque to a first wheel of the plurality of wheels on the vehicle at step 810, the amount of torque that was reduced may be distributed to a second wheel on the vehicle by increasing the torque to the second wheel. For example, the increase in the torque for the second wheel may be equal to the amount of torque reduced to the first wheel. In some embodiments, to maintain yaw stability of the vehicle, the second wheel may be selected to be on a same side as the first wheel (e.g., if the first wheel is a front left wheel of the vehicle, the second wheel may be a back left wheel). Processing may then continue to step 814.

In some embodiments, the increased torque to the second wheel may cause the torque of the second wheel to also approach or exceed the traction limit of the second wheel. Therefore, at step 814, the vehicle (e.g., or processing circuitry onboard the vehicle) determines if the increased grounded torque request for the second wheel exceeds the traction limit of the second wheel. If the grounded torque request for the second wheel does not exceed the traction limit ("NO" to step 814), then processing continues to step 816, where the increased torque is applied to the second wheel, and then the processing returns to step 802. If the grounded torque request for the second wheel exceeds the traction limit ("YES" to step 814), processing continues to step 818.

At step 818, upon determining that the increased torque to the second wheel exceeds the traction limit of the second wheel, the increased torque to the second wheel may also be reduced, such that the torque to the second wheel is below its traction limit. The amount of excess torque may then be distributed one or more wheels on a different side of the vehicle. For example, if the second wheel is a back left wheel, the excess torque may be distributed to one or more wheels on a right side of the vehicle. In some embodiments, to maintain the yaw stability of the vehicle, the excess torque may be distributed to a third wheel on the different side, but on a same axle as the second wheel. For example, if the second wheel is the back left wheel, the third wheel may be a back right wheel. Such a distribution of torque enables the torques to each wheel on an axle to remain similar, reducing the change in yaw of the vehicle.

FIG. 9 depicts a system diagram of an illustrative system 900 including control system 901, input variables 902 and 904, and output variables 926-932, in accordance with several embodiments of the disclosure. As shown, the control systems 901 includes a communication interface 907, a processing circuitry 922, sensors 912-921 and motor and brake controller 924. The illustrative processing circuitry 922 includes processor 908 and memory 910. In an illustrative example, the control system 901 may be used for distributing a grounded torque request to the wheels of a vehicle (e.g., for better control on uneven and different friction surfaces when using two or more powered wheels), as well as determining a plurality of traction limits for each wheel of a plurality of wheels. In some embodiments, system 900 is incorporated into vehicle 100 of FIG. 1 to control the torque applied to wheels 102a, 102b, 102c, and 102d.

Processing circuitry 922 may include hardware, software, or both, implemented on one or more modules configured to provide control of front wheels 926 and 928 and rear wheels 930 and 932 of a vehicle. In some embodiments, processor 908 includes one or more microprocessors, microcontrollers, digital signal processors, programmable logic devices, field-programmable gate arrays (FPGAs), application-specific integrated circuits (ASICs), or any suitable combination thereof. In some embodiments, processor 908 is distributed across more than one processor or processing units. In some embodiments, processing circuitry 922 executes instructions stored in memory for managing a quad motor vehicle 100, a triple motor vehicle (not shown), a dual motor vehicle (not shown), or a single motor vehicle. In some embodiments, memory 910 is an electronic storage device that is part of processing circuitry 922. For example, memory 910 may be configured to store electronic data, computer instructions, applications, firmware, or any other suitable information (e.g., information obtained from a cloud system with previous slip information from other vehicles, as described in at least FIG. 4). In some embodiments, memory 910 includes random-access memory, read-only memory, hard drives, optical drives, solid-state devices, or any other suitable memory storage devices, or any combination thereof. For example, the memory may be used to launch a start-up routine. The communication interface 907 may include electrical terminals, level shifters, a communications module, connectors, cables, antennas, any other suitable components for transmitting and receiving information, or any combination thereof. For example, the communications interface 907 may include an Ethernet interface, a Wi-Fi interface, an optical interface, a sensor interface (e.g., for interacting with one or more sensors 912-921), any other suitable wired or wireless interface, or any combination thereof. To illustrate, the communication interface 907 may include a sensor interface having a power supply, analog-to-digital converter, digital-to-analog converter, signal processing equipment, signal conditioning equipment, connectors, electrical terminals, any other suitable components for managing signals to and from a sensor, or any combination thereof. To illustrate further, a sensor interface may be configured to communicate with the resolvers 912 (e.g., a rotary encoder coupled to the motor shaft or gear shaft), vertical displacement sensor 914, orientation sensor 916, speed sensor 918, accelerometer sensor 920 (e.g., a vibration sensor), steering wheel angle sensor 921, any other suitable sensor or any combination thereof. In some embodiments, communications interface 907 is configured to transmit a control signal indicative of a motor command to each wheel 102a, 102b, 102c, 102d of vehicle 100. In some embodiments, communication interface 907 is incorporated into processing circuitry 922, motor/brake controller 924, or both.

In some embodiments, the system may include resolvers 912, vertical displacement sensor 914, orientation sensor 916, speed sensor 918, accelerometer sensor 920 and steering wheel angle sensor 921. In some embodiments, the control circuitry may be communicatively connected to resolvers 912 (e.g., a sensory) which may be coupled to a motor shaft of the motor (e.g., motors 112, 114, 116, 118 from FIG. 1). In some embodiments, the resolvers 912 may be a type of transformer/electromagnetic transducer that measures the degrees of rotation of a motor shaft of the vehicle. For example, the resolvers 912 may be a type of rotary transformer including a cylindrical rotor and stator. In some embodiments, the control circuitry may be communicatively connected to one or more resolvers 912 that provide data indicative of the wheel rotation of each of front wheels 926 and 928 and rear wheels 930 and 932. In some embodiments, front wheels 926 and 928 and rear wheels 930 and 932 correspond to wheels 102a, 102b, 102c, and 102d of the vehicle of FIG. 1. In some embodiments, based on the data provided by the resolvers, the control circuitry may determine wheel slip, and monitor if the torque exceeds a determined traction limit of the wheel. In some embodiments, the control circuitry may be communicatively connected to a steering wheel angle sensor 921 that provides data indicative of the steering angle of the vehicle. In some embodiments, the processing circuitry 922 may be communicatively connected to one or more orientation sensors 916 that provide data indicative of the orientation of vehicle 100 in 3D space. For example, orientation sensors 916 may provide data indicative of a pitch angle of vehicle 100, yaw angle of vehicle 100, and roll angle of vehicle 100, to be utilized in some embodiments in the process described by flowchart 500 in FIG. 5. In some embodiments, the control circuitry may be communicatively connected to a speed sensor 918 that provides the current speed of vehicle 100. In some embodiments, the control circuitry may be communicatively connected to an accelerometer sensor 920 that provides the current acceleration of vehicle 100.

Illustrative system 900 of FIG. 9 (e.g., processing circuitry 922) may be used to perform any or all of the illustrative steps of the previously described flowcharts 500, 600, 700, or 800 in FIGS. 5-8. Illustrative system 900 of FIG. 9 may be used to control any of the wheel/motor configurations shown in FIGS. 1-4, in accordance with the present disclosure. In some embodiments, not all components shown in FIG. 9 need to be included in system 900.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following paragraphs.

While some portions of this disclosure may refer to examples, any such reference is merely to provide context to the instant disclosure and does not form any admission as to what constitutes the state of the art.

What is claimed is:

1. A method, comprising:
    determining a plurality of traction limits, each traction limit corresponding to a wheel of a plurality of wheels of a vehicle;
    determining a grounded torque request;
    distributing the grounded torque request as a respective grounded torque request to each of the plurality of wheels such that, for each wheel, the respective grounded torque request is less than a respective traction limit of the plurality of traction limits to prevent slip, wherein distributing the grounded torque request comprises:
        determining whether the respective grounded torque request for a first wheel of the plurality of wheels exceeds a traction limit for the first wheel;
        applying a reduced torque to the first wheel when the respective grounded torque request for the first wheel exceeds the traction limit for the first wheel to prevent slip;
        determining whether an increased torque for a second wheel of the plurality of wheels exceeds a traction limit for the second wheel, wherein the first and second wheels are on a same side of the vehicle; and
        applying an increased torque to a third wheel of the plurality of wheels when the increased torque for the second wheel exceeds the traction limit for the second wheel to prevent slip, wherein the third wheel is on an opposite side of the vehicle than the first and second wheels.

2. The method of claim 1, wherein determining the grounded torque request comprises determining a position of an accelerator pedal of the vehicle.

3. The method of claim 1, wherein distributing the grounded torque request to each of the plurality of wheels further comprises:
    applying the increased torque to the second wheel when the increased torque for the second wheel is within the traction limit for the second wheel.

4. The method of claim 1, wherein distributing the grounded torque request to each of the plurality of wheels is further based on a steering angle of the vehicle.

5. The method of claim 1, wherein the plurality of traction limits are determined based on vertical displacements of the plurality of wheels.

6. The method of claim 1, wherein the plurality of traction limits are determined based on estimated friction corresponding to the plurality of wheels.

7. The method of claim 6, further comprising:
    determining the estimated friction based on a previous wheel slip at a location corresponding to the vehicle or weather information at the location of the vehicle.

8. A vehicle comprising:
    a plurality of wheels; and
    processing circuitry configured to:
        determine a plurality of traction limits, each traction limit corresponding to a wheel of the plurality of wheels;
        determine a grounded torque request;
        distribute the grounded torque request as a respective grounded torque request to each of the plurality of wheels such that, for each wheel, the respective grounded torque request is less than a respective traction limit of the plurality of traction limits to prevent slip, wherein distributing the grounded torque request comprises:
            determine whether the respective grounded torque request for a first wheel of the plurality of wheels exceeds a traction limit for the first wheel;
            apply a reduced torque to the first wheel when the respective grounded torque request for the first wheel exceeds the traction limit for the first wheel to prevent slip;
            determine whether an increased torque for a second wheel of the plurality of wheels exceeds a traction limit for the second wheel, wherein the first and second wheels are on a same side of the vehicle; and apply an increased torque to a third wheel of the plurality of wheels when the increased torque for the second wheel exceeds the traction limit for the second wheel to prevent slip, wherein the third wheel is on an opposite side of the vehicle than the first and second wheels.

9. The vehicle of claim 8, further comprising a plurality of motors, each connected to a respective one of the plurality of wheels, wherein:

the processing circuitry is configured to determine the grounded torque request by determining a position of an accelerator pedal of the vehicle; and the processing circuitry is configured to distribute the grounded torque request to each of the plurality of wheels based on the plurality of traction limits by actuating the plurality of motors to provide respective torques to the plurality of wheels.

10. The vehicle of claim 8, wherein the processing circuitry is further configured to:

apply the increased torque to the second wheel when the increased torque for the second wheel is within the traction limit for the second wheel.

11. The vehicle of claim 8, wherein the processing circuitry is further configured to distribute the grounded torque request to each of the plurality of wheels based on a steering angle of the vehicle.

12. The vehicle of claim 8, wherein the plurality of traction limits are determined based on vertical displacements of the plurality of wheels.

13. The vehicle of claim 8, wherein the plurality of traction limits are determined based on estimated friction corresponding to the plurality of wheels or weather information at a location of the vehicle.

14. A non-transitory computer-readable medium having non-transitory computer-readable instructions encoded thereon that, when executed by a processor, cause the processor to:

determine a plurality of traction limits, each traction limit corresponding to a wheel of a plurality of wheels of a vehicle;

determine a grounded torque request; and distribute the grounded torque request as a respective grounded torque request to each of the plurality of wheels such that, for each wheel, the respective grounded torque request is less than a respective traction limit of the plurality of traction limits to prevent slip, wherein distributing the grounded torque request comprises:

determine whether the respective grounded torque request for a first wheel of the plurality of wheels exceeds a traction limit for the first wheel;

apply a reduced torque to the first wheel when the respective grounded torque request for the first wheel exceeds the traction limit for the first wheel to prevent slip;

determine whether an increased torque for a second wheel of the plurality of wheels exceeds a traction limit for the second wheel, wherein the first and second wheels are on a same side of the vehicle; and apply an increased torque to a third wheel of the plurality of wheels when the increased torque for the second wheel exceeds the traction limit for the second wheel to prevent slip, wherein the third wheel is on an opposite side of the vehicle than the first and second wheels.

* * * * *